Figure 1:
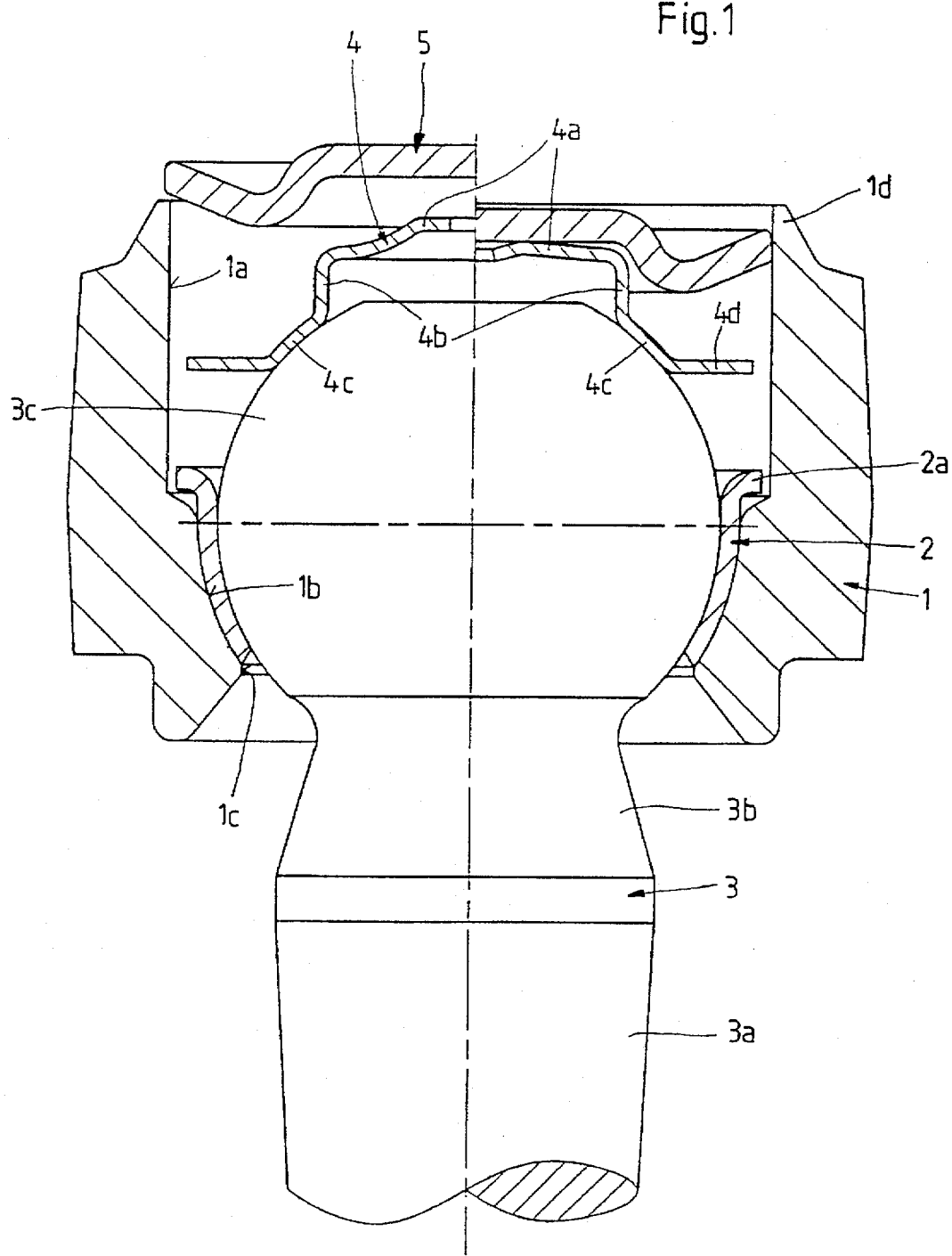

United States Patent [19]

Lieber et al.

[11] Patent Number: 5,672,023
[45] Date of Patent: Sep. 30, 1997

[54] BALL JOINT

[75] Inventors: Hanno Lieber, Essen-Kettwig; Erhard Welchert, Jüchen-Gierath, both of Germany

[73] Assignee: TRW Fahrwerksystems GmbH & Co. KG, Dusseldorf, Germany

[21] Appl. No.: 631,030

[22] Filed: Apr. 12, 1996

[30] Foreign Application Priority Data

Apr. 12, 1995 [DE] Germany ............ 195 13 826.0

[51] Int. Cl.$^6$ ............................................ F16C 11/08
[52] U.S. Cl. ..................... 403/138; 403/144; 403/135
[58] Field of Search ........................... 403/138, 144, 403/135, 133, 132, 129

[56] References Cited

U.S. PATENT DOCUMENTS

| | | | |
|---|---|---|---|
| 3,089,718 | 5/1963 | Gottschald et al. | 403/131 |
| 3,483,888 | 12/1969 | Wurzel | 403/135 X |
| 4,035,094 | 7/1977 | Herbenar | 403/144 |
| 4,113,396 | 9/1978 | Smith | 403/138 |
| 4,163,617 | 8/1979 | Nemoto | 403/132 |
| 4,415,291 | 11/1983 | Smith | 403/36 |
| 4,538,935 | 9/1985 | Burnmeister et al. | 403/135 X |
| 4,693,628 | 9/1987 | Renk | 403/144 X |
| 5,551,791 | 9/1996 | Schneider | 403/138 X |

FOREIGN PATENT DOCUMENTS 2503291 10/1982 France.
2443089 3/1976 Germany.

*Primary Examiner*—Anthony Knight
*Attorney, Agent, or Firm*—Tarolli, Sundheim, Covell, Tummino & Szabo

[57] ABSTRACT

The invention pertains to a ball joint, having a ball joint socket (1), inside of which the ball (3c) of a ball-ended spindle (3) is arranged in a rotatable and tiltable manner by means of a bearing shell (2) that supports the ball (3c) below its largest diameter on a bearing surface that has the shape of a ball race, namely under the influence of spring force generated by a spring element (4) that simultaneously forms the upper bearing shell and is supported on the underside of a cover (5) that closes the ball joint socket (1). In order to entirely eliminate all manufacturing tolerances during assembly of the ball joint and provide defined spring forces that compensate for the wear-related elasticity of the ball joint until a defined wear is reached after assembly, the cover (5) which is realized in such a way that its outer diameter exceeds the inner diameter of the ball joint socket (1) in the initial state is nonpositively supported in the ball joint socket (1) with its edge (5c). The spring element (4) is exclusively supported in the center of the cover (5) by means of spring tabs (4a) that point toward the center and transform into a cylindrical center part (4b) at their outer edge, with a marginal region (4c) that has the shape of a ball race and adjoins the surface of the ball (3c) situated adjacent to the cylindrical center part.

10 Claims, 4 Drawing Sheets

BALL JOINT

The invention pertains to a ball joint that, in particular, is intended for tie rods and steering rods of utility vehicles, comprising a ball joint socket, inside of which the ball of a ball-ended spindle is arranged in a rotatable and tiltable manner by means of a bearing shell positively arranged in the lower part of the ball joint socket which supports the ball below its largest diameter on a bearing surface that has the shape of a ball race, namely under the influence of spring force generated by a spring element that simultaneously forms an upper bearing shell and is supported on the underside of a cover that closes the ball joint socket.

Ball joints of this type are generally known. In these ball joints, the edge of the cover is positively rolled into a groove of the ball Joint socket, namely together with the edge of the spring element that adjoins the underside of the cover with its center and generates its spring forces with an annular region situated between its central contact region and its marginal clamping region.

This known construction has the disadvantage that the spring characteristics of the spring element are almost entirely used for compensating tolerances during assembly of the ball joint; namely, because the position of the cover and the spring element relative to the ball joint socket is predetermined by the groove arranged in the socket. Consequently, slight wear already leads to a premature play in a ball joint of this type. This means that this ball joint only has a limited service life and the risk of a premature total failure escalates once the progressively increasing wear exceeds a certain value.

The invention is based on the objective of additionally developing a ball joint of the previously described type in such a way that a defined initial state in which the manufacturing tolerances are entirely compensated is attained after assembly, and that the spring element provides defined spring forces in the initial state which compensate the wear-related elasticity of the ball joint until a defined wear is reached.

According to the invention, the solution to this objective is characterized by the fact that the cover, the outer diameter of which exceeds the inner diameter of the ball joint socket in the initial state, is nonpositively supported in the ball joint socket with its edge, and that the spring element is exclusively supported in the center of the cover by means of spring tabs that point toward the center and transform into a cylindrical center part at their outer edge, with a marginal region that has the shape of a ball race and adjoins the surface of the ball situated adjacent to said cylindrical center part.

During the assembly of the ball joint according to the invention, the cover is elastically deformed with a predetermined force generated in the center of the cover; namely, such that the edge of the cover, the outer diameter of which exceeds the inner diameter of the ball joint socket in the initial state, is pressed into the bore of the ball joint socket. The cover is pressed into the ball joint socket until the cylindrical center part adjoins the surface of the ball in a defined fashion, with the edge of the cover being nonpositively supported in the ball joint socket. Due to this nonpositive support of the edge of the cover in the socket, at the end of assembly the cover assumes a position which is predetermined by the respective manufacturing tolerances; not a positive fit, as is the case with the state of the art.

Since the cylindrical center part of the spring element positively adjoins the surface of the ball at the end of assembly, the spring tabs of the spring element are deformed in a defined fashion with their maximum springiness, i.e., said spring tabs store the highest spring force possible due to their elasticity. Consequently, all manufacturing tolerances in the assembled ball joint are eliminated without using part of the spring forces of the spring element for this purpose. The highest spring forces possible are available for compensating for wear that occurs during use of the ball joint. Due to the friction paths of the spring tabs on the cover, this results in a self-damping of the ball joint which significantly reduces the premature wear of the ball joint due to high-frequency, shock-like stresses between the ball surface and the bearing surface.

As soon as the maximum permissible wear between the ball and the bearing shell is reached, the spring forces of the spring element are depleted—without, however, causing the total failure of the ball joint. The noticeable play of the ball joint notifies the driver about the impending need for replacement of said ball joint that, however, is still functional.

In order to realize the outer diameter of the cover in such a way that it is larger than the inner diameter of the ball joint socket in the initial state, i.e., before assembly, one additional characteristic of the invention proposes to arrange an annular depression that extends toward the spring element within the marginal region of the cover, with the neutral axis of said depression lying underneath the annular contact line between the lower edge of the cover and the cylindrical inner surface of the socket. This measure results in an elastic marginal region for the cover which reliably fixes the edge of the cover in the bore of the ball joint socket in a nonpositive fashion.

According to one additional characteristic of the invention which serves exclusively for safety purposes, it is proposed to roll in the edge of the ball joint socket after assembly of the cover is completed so as to form a positive limit stop; however, this rolling process does not represent a positive localization of the edge of the cover during assembly.

In one preferred embodiment of the invention, the marginal region of the spring element, having the shape of a ball race, is situated adjacent to the cylindrical center part and serving as the upper bearing shell, ends in an outwardly protruding annular collar. Due to this measure, a procedurally safe manufacture of the spring element is attained.

The invention additionally proposes to realize the spring tabs in such a way that they continuously transform into the cylindrical center part of the spring element while forming a rolling radius. Due to this measure, localized deformations which could result in an unintentional predetermined breaking point are prevented.

Figure 2:
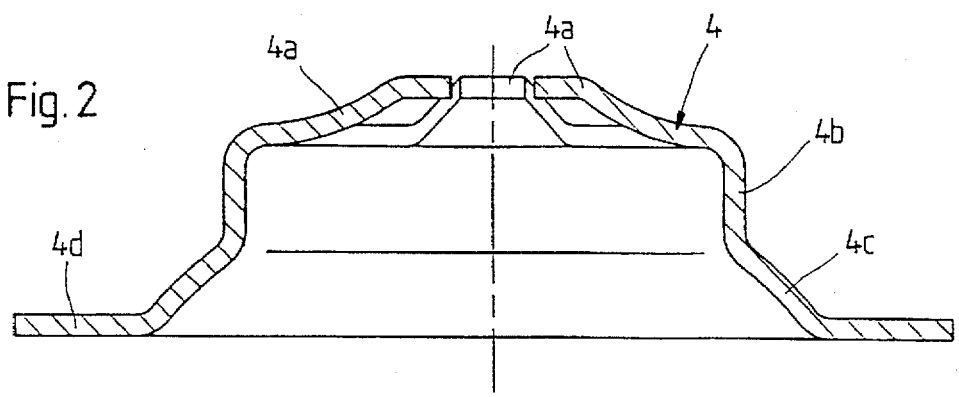
Figure 3:
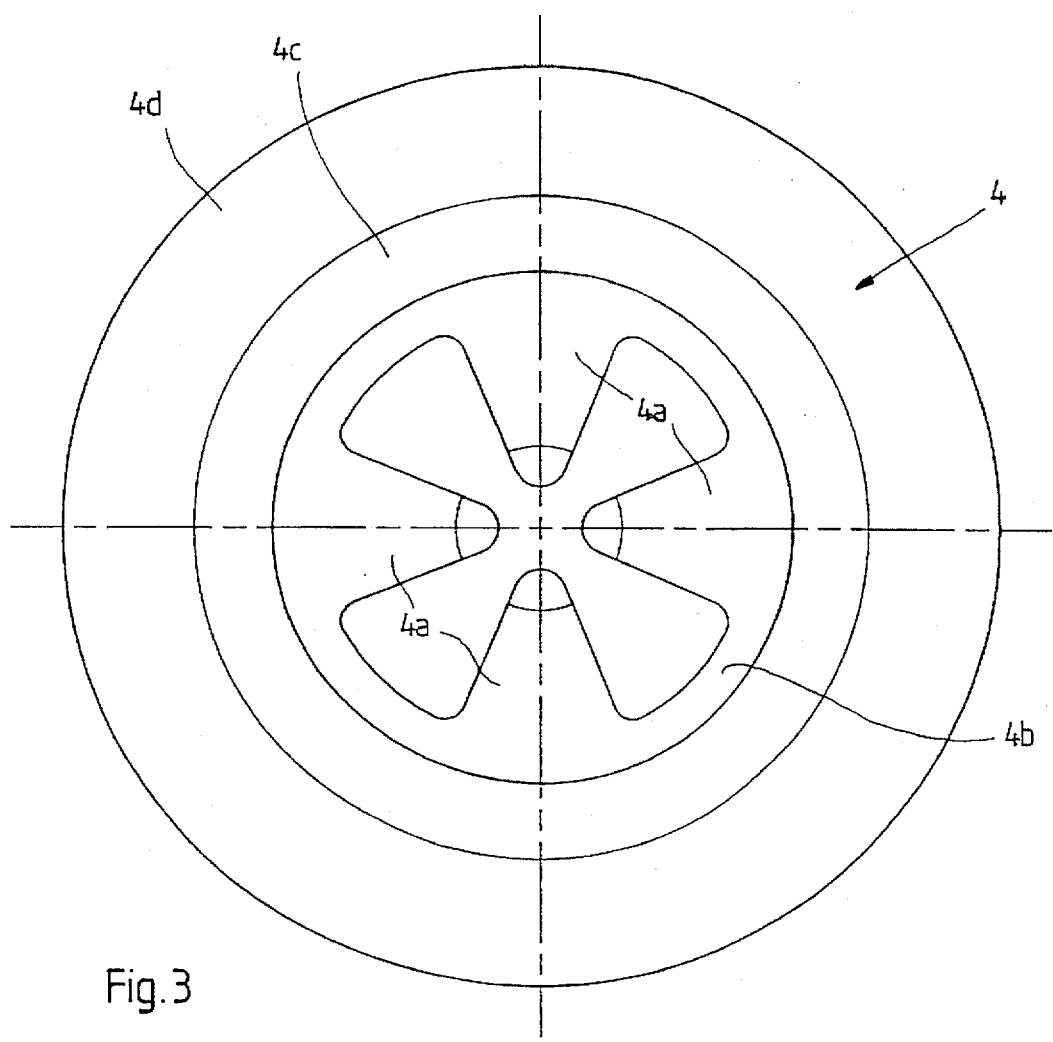
Figure 4:
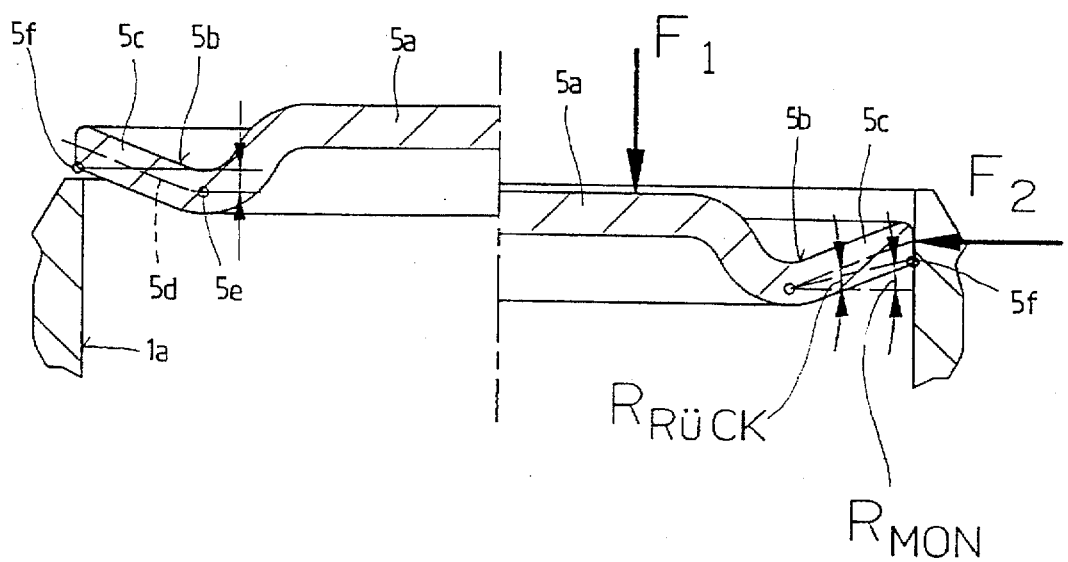
Figure 5:
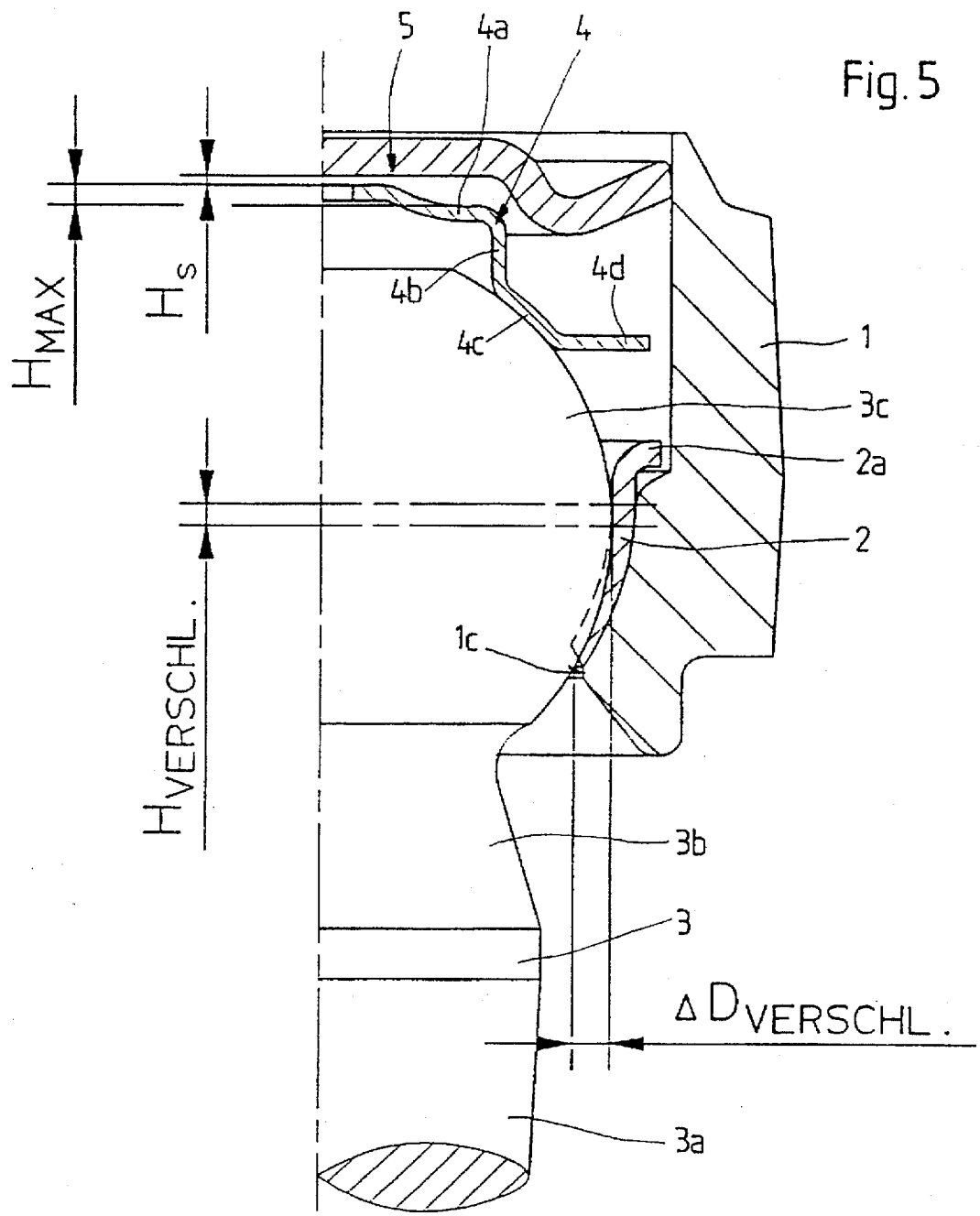

The figures show one embodiment of the ball joint according to the invention, a corresponding spring element and cover as well as illustrations of the cover assembly and the wear behavior of the joint, namely:

FIG. 1, a longitudinal section through the ball joint before and after cover assembly, FIG. 2, a cross-section through the corresponding spring element before its assembly, FIG. 3, a plan view of the spring element according to FIG. 2, FIG. 4, an enlarged sectional representation of the cover before and after assembly, and FIG. 5, a longitudinal section through the ball joint after the maximum permissible wear has occurred; namely, a longitudinal section corresponding to the one shown in FIG. 1.

The ball joint which is shown before cover assembly in the left half of FIG. 1 and after cover assembly in the right half of FIG. 1 comprises a ball joint socket 1 provided with a cylindrical bore 1a and a bearing surface 1b that has the shape of a ball race and serves to accommodate a bearing shell 2. The bearing shell 2 has an edge 2a that protrudes radially outward and ends in front of a passage 1c for a ball-ended spindle 3 which is arranged in the lower part of the ball joint socket 1.

In the embodiment shown, the ball-ended spindle 3 comprises a slightly conical spindle part 3a that transforms into a ball 3c in the form of a transition 3b that is conically tapered in the opposite direction. Below its largest diameter, this ball 3c adjoins the bearing surface of the bearing shell 2 which has the shape of a ball race.

A spring element 4 presses the ball 3c in the direction of the bearing shell 2, one embodiment of which is shown in FIGS. 2 and 3. These Figures show that the spring element 4 used in this embodiment comprises four spring tabs 4a that point toward the center and transform into a cylindrical center part 4b in the form of a curve. A marginal region 4c that ultimately transforms into a radially outward-protruding annular collar 4d is situated adjacent to this cylindrical center part 4b. The spring element 4 adjoins the surface of the ball 3c with its marginal region 4c that has the shape of a ball race, namely above the largest diameter of said ball.

In the assembled state, the spring tabs 4a are supported with their pointed end regions on the underside of the cover 5, an enlarged illustration of which is shown in FIG. 4.

According to this figure, the cover 5 has a circular, plane central region 5a. An annular depression 5b that extends toward the spring element 4 and transforms into a transversely extending marginal region 5c is situated adjacent to the aforementioned central region. The neutral axis 5d, illustrated in the form of broken lines in FIG. 4, lies at the lowest point 5e of the depression 5b underneath the annular contact line 5f. This contact line indicates the contact between the edge of the cover 5 and the cylindrical bore 1a of the ball joint socket 1 during and after assembly.

Due to this arrangement illustrated in detail in FIG. 4, it is possible to press the cover 5 into the ball joint socket 1 with a relatively insignificant assembly force $F_1$ that is exerted centrally upon the circular central region 5a. Due to the depression 5b and the adjacent transverse marginal region 5c, the marginal region 5c is elastically bent back opposite the pressing-in movement during assembly, so that an adaptation of the outer diameter of the cover 5, which is larger in the initial state, to the smaller inner diameter, i.e., to the bore 1a of the ball joint socket 1, is attained. The pressing-in of the cover 5 is concluded as soon as the cylindrical center part 5b of the spring element 4 adjoins the ball 3c without play, as shown in the right half of FIG. 1. Consequently, all manufacturing tolerances are compensated once the cover assembly is completed. According to the right half of FIG. 4, the elastically deformed marginal region 5c of the cover 5 causes a secure localization of the edge of the cover on the ball joint socket 1 in the assembled state, namely because the restoring forces present in this marginal region tend to press the central region 5a of the cover 5 back out of the cylindrical bore 1a of the ball joint socket 1. However, the increase in the diameter of the cover 5 required for this is prevented due to the fact that its marginal region 5c adjoins the cylindrical bore 1a of the ball joint socket 1. Consequently, this measure results in a clamping force $F_2$ that securely retains the cover 5 in the cylindrical bore 1a of the ball joint socket 1 despite the exclusively nonpositive localization. The right half of FIG. 4 also shows that the restoring force $F_{Rück}$ symbolized by the angle is higher than the restoring force $R_{Mon}$ generated within this region during the assembly.

FIG. 5 shows a longitudinal section through a ball joint in which the bearing shell 3c has been displaced in the direction of the passage 1c by the distance $H_{WEAR}$ due to the wear of the ball 3c or the bearing shell 2. For reasons of simplicity, only the wear of the bearing shell 2, the initial state of which is illustrated in the form of broken lines in FIG. 5, is indicated in this figure.

The result of this axial displacement of the ball 3c is that the spring element 4 no longer exerts a spring force upon the ball 3c because the spring tabs 4a are no longer supported on the cover 5.

Consequently, FIG. 5 shows such an intense wear that a certain play $H_s$ is formed between the maximum adjustment $H_{MAX}$, i.e., the maximum spring travel of the spring tabs 4a of the spring element 4, and the cover 5. Due to this play $H_s$, the ball joint generates clattering noises that alert the driver to the impending need for replacement of said ball joint that, however, still remains functional because the ball 3c is still reliably arranged and retained in the ball joint socket 1 by means of the bearing shell 2. The overlap $\Delta D_{WEAR}$ still exists after such a wear has occurred is illustrated in FIG. 5.

List of reference symbols
1 Ball joint socket
1a Bore
1b Bearing surface
1c Passage
1d Edge
2 Bearing shell
2a Edge
3 Ball-ended spindle
3a Spindle part
3b Transition
3c Ball
4 Spring element
4a Spring tab
4b Center part
4c Marginal region
4d Annular collar
5 Cover
5a Central region
5b Depression
5c Marginal region
5d Neutral axis
5e Lowest point
5f Contact line
$F_1$ Assembly force
$F_2$ Clamping force
$R_{Rück}$ Restoring force
$R_{Mon}$ Assembly force
$H_{WEAR}$ Wear-related displacement
$H_{MAX}$ Maximum adjustment
$H_s$ Play
$\Delta D_{WEAR}$ Overlap Having described the invention, the following is claimed:

1. Ball joint, in particular, for tie rods and steering rods of utility vehicles, comprising a ball joint socket, inside of which the ball of a ball-ended spindle is arranged in a rotatable and tiltable manner arranged by means of a bearing shell positively arranged in the lower part of the ball joint socket which supports the ball below its largest diameter on a bearing surface that has the shape of a ball race, namely under the influence of spring force generated by a spring element that simultaneously forms an upper bearing shell and is supported on the underside of a cover that closes the ball joint socket, characterized by the fact that the cover (5), the outer diameter of which exceeds the inner diameter of the ball joint socket (1) in the initial state, is nonpositively supported in the ball joint socket (1) with its edge (5c), and that the spring element (4) is exclusively supported in the center of the cover (5) by means of spring tabs (4a) that point toward the center and transform into a cylindrical center part (4b) at their outer edge, with a marginal region (4c) that has the shape of a ball race and adjoins the surface of the ball (3c) situated adjacent to said cylindrical center part.

2. Ball joint according to claim 1, characterized by the fact that an annular depression (5b) that extends toward the spring element (4) is arranged in the marginal region (5c) of the cover (5), with the neutral axis (5d) of said depression lying underneath the annular contact line (5f) between the lower edge of the cover and the cylindrical inner surface of the ball joint socket (1).

3. Ball joint according to claim 2 characterized by the fact that the marginal region (4c) of the spring element (4) which has the shape of a ball race and is situated adjacent to the cylindrical center part (4b) ends in an outwardly protruding annular collar (4d).

4. Ball joint according to claim 2 characterized by the fact that the spring tabs (4a) continuously transform into cylindrical center part (4b) of the spring element (4) while forming a rolling radius.

5. Ball joint according to claim 1, characterized by the fact that the marginal region (4c) of the spring element (4) which has the shape of a ball race and is situated adjacent to the cylindrical center part (4b) ends in an outwardly protruding annular collar (4d).

6. Ball joint according to claim 5 characterized by the fact that the spring tabs (4a) continuously transform into cylindrical center part (4b) of the spring element (4) while forming a rolling radius.

7. Ball joint according to claim 1, characterized by the fact that the spring tabs (4a) continuously transform into the cylindrical center part (4b) of the spring element (4) while forming a rolling radius.

8. Ball joint comprising:

a ball joint socket having a first diameter;

a ball-ended spindle having a ball disposed inside of the ball joint socket in a rotatable and tiltable manner;

a first bearing shell positively disposed in the ball joint socket, the first bearing shell engaging and supporting the ball at a first end of the ball and having the shape of a ball race;

a cover having a circumferential edge extending around a center of the cover, the cover having a second diameter, larger than the first diameter, and the edge of the cover being nonpositively supported in the ball joint socket to close the ball joint socket; and a spring disposed between the cover and the ball, the spring exerting a force on the ball and having a marginal region forming a second bearing shell having the shape of a ball race and engaging the ball at a second end of the ball, opposite the first end, the spring having spring tabs extending from an axially extending cylindrical portion of the spring, the spring engaging the center of the cover and being the exclusive portion engaging the center of the cover.

9. Ball joint according to claim 8 wherein the spring is spaced from the ball joint socket.

10. Ball joint according to claim 8 wherein the cylindrical portion of the spring is disposed between the spring tabs and the marginal region.

* * * * *